US006623087B1

United States Patent
Wolff

(10) Patent No.: US 6,623,087 B1
(45) Date of Patent: Sep. 23, 2003

(54) CONTROL UNIT FOR A WHEEL BRAKE OF A MOTOR VEHICLE

(75) Inventor: Guenter Wolff, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,119

(22) PCT Filed: Sep. 14, 2000

(86) PCT No.: PCT/DE00/03201

§ 371 (c)(1),
(2), (4) Date: Jul. 1, 2002

(87) PCT Pub. No.: WO01/28833

PCT Pub. Date: Apr. 26, 2001

(30) Foreign Application Priority Data

Oct. 15, 1999 (DE) .......................... 199 49 816

(51) Int. Cl.[7] .......................... B60T 13/74; B60T 13/66; B60T 8/44; B60T 8/48
(52) U.S. Cl. ................ 303/10; 303/116.1; 303/DIG. 3; 303/166; 303/DIG. 4; 303/155; 303/115.4
(58) Field of Search ................. 303/10, 11, 3, 303/115.4, 15, DIG. 3, DIG. 4, 166, 900, 901, 155, 116.1–119.1, 113.4, 114.1; 188/358, 359; 60/545, 547.1; 701/70, 80

(56) References Cited

U.S. PATENT DOCUMENTS

| | | | | |
|---|---|---|---|---|
| 3,756,664 A | * | 9/1973 | Schlitz et al. ................ 303/10 |
| 4,435,021 A | * | 3/1984 | Hoenick et al. ............... 303/10 |
| 4,826,255 A | * | 5/1989 | Volz ............................ 303/10 |
| 5,000,295 A | * | 3/1991 | Fargier |
| 5,103,940 A | * | 4/1992 | Meneut et al. |
| 5,722,744 A | * | 3/1998 | Kupfer et al. ................ 303/10 |
| 6,030,055 A | * | 2/2000 | Schubert |
| 6,170,921 B1 | * | 1/2001 | Naerheim |
| 6,322,163 B1 | * | 11/2001 | Siegel ...................... 303/115.4 |
| 6,328,388 B1 | * | 12/2001 | Mohr et al. ................... 303/10 |

FOREIGN PATENT DOCUMENTS

| | | |
|---|---|---|
| DE | 35 02 451 A | 7/1986 |
| DE | 37 05 311 A | 9/1988 |
| DE | 40 19 178 A | 2/1992 |
| DE | 195 27 936 A1 | 1/1997 |
| DE | 199 05 660 A | 5/2000 |
| WO | 93 09012 A | 5/1993 |

* cited by examiner

Primary Examiner—Douglas C. Butler
(74) Attorney, Agent, or Firm—Michael J. Striker

(57) ABSTRACT

An actuating unit (1) for a wheel brake (2) of a motor vehicle has a hydraulic pump (12), which can be driven at variable speeds by an electric motor (11) and supplies pressure fluid from a storage tank (22), and has an element (24), which adjusts a return flow of pressure fluid to the pump (12) and is disposed between the pressure side (13) and the suction side (16) of the pump (12). In addition, a cylinder-piston unit (3) is provided, which is for pressing a brake lining (7) against a friction element (8) connected to a vehicle wheel. For purposes of controlling the brake pressure as a function of wheel slip, a pressure increase valve (18) and a pressure decrease valve (21) are disposed between the pump (12) and the cylinder-piston unit (3). In addition, a control unit (29) is provided, which can process electrical brake request signals and slip signals and can control the electric motor (11), the element (24), and the valves (18, 21).

3 Claims, 1 Drawing Sheet

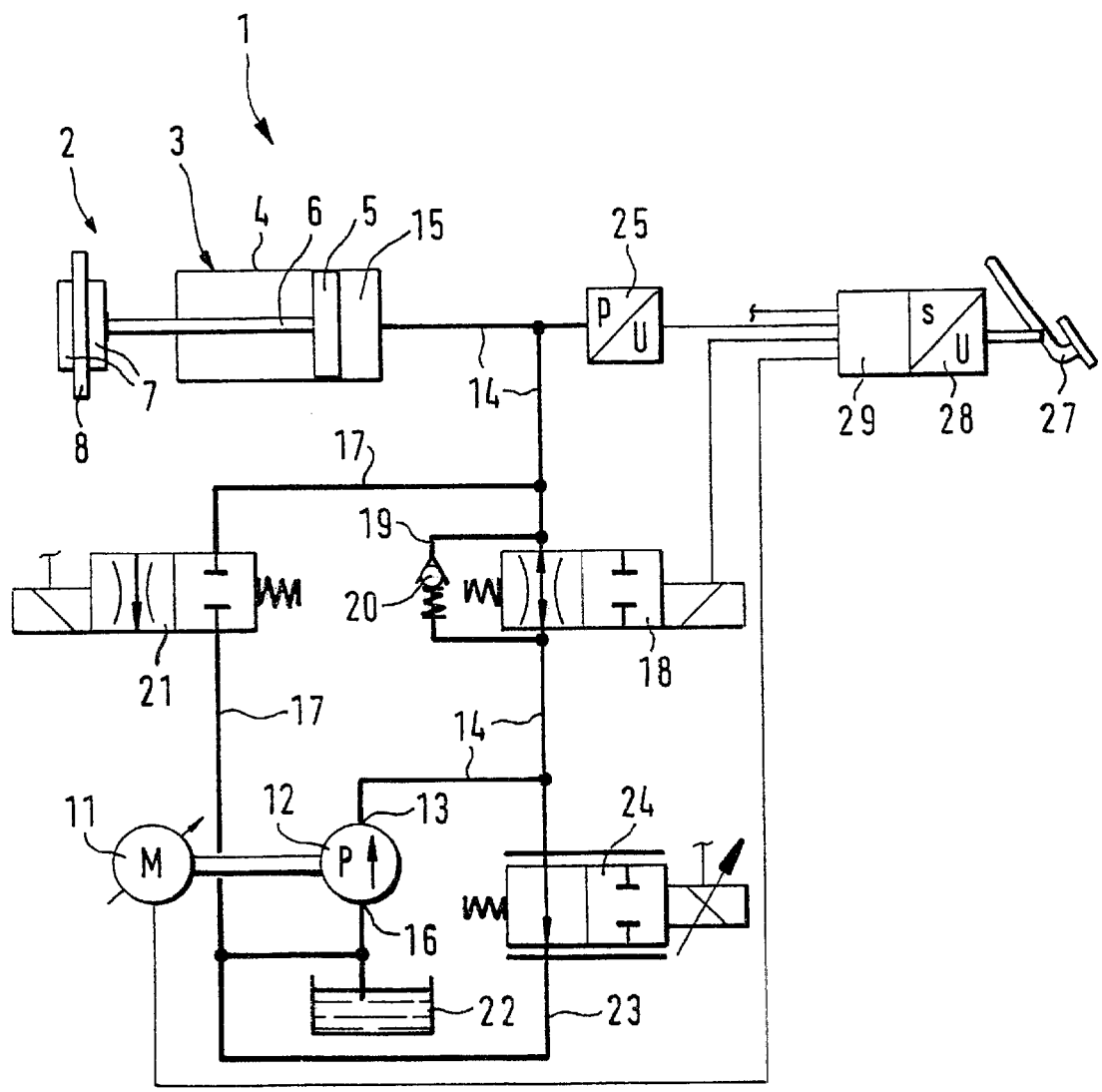

CONTROL UNIT FOR A WHEEL BRAKE OF A MOTOR VEHICLE

This application is a 371 of PCT/DE00/03201 filed Sep. 14, 2000.

BACKGROUND OF THE INVENTION

The invention is based on an actuating unit.

An actuating unit of this kind for a wheel brake of a motor vehicle has already been disclosed (DE 195 27 936 A1) in which a variable speed controllable electric motor drives a gear pump, which supplies pressure fluid from a storage tank to a cylinder-piston unit, whose piston can press a brake lining against a friction element connected to a vehicle wheel. On the pressure side, the pump is provided with a throttle, which can control a connection to the storage tank. The pump drive mechanism and the throttle are correspondingly controlled by means of an electronic brake regulation in order to achieve pressure increase, pressure maintenance, and pressure decrease in the cylinder-piston unit.

SUMMARY OF THE INVENTION

The actuating unit according to the invention has the advantage over the prior art that on the one hand, in the cooperation of the pump and the element that adjusts the return flow of pressure fluid to the pump, the pressure in the cylinder-piston unit as well as the gradient for pressure increase and pressure decrease can be controlled, but on the other hand, it is also possible to achieve a slip-dependent modulation of the pressure with high dynamics by means of the pressure increase valve and the pressure decrease valve.

BRIEF DESCRIPTION OF THE DRAWINGS

An exemplary embodiment of the invention is shown in a simplified fashion in the drawing in the form of a wiring diagram of an actuating unit for a wheel brake of a motor vehicle and will be explained in detail in the following description.

DESCRIPTION OF THE PREFERRED EMBODIMENT

A motor vehicle that is not shown in the drawing is equipped with an actuating unit 1 for a wheel brake 2 on each of its wheels. The actuating unit 1, which is shown in the form of a wiring diagram, has a cylinder-piston unit 3, in whose cylinder 4 a piston 5 is guided with a piston rod 6. The piston rod 6 acts on at least one brake lining 7, which can be pressed against and lifted away from a friction element 8 connected to a vehicle wheel, for example a brake disk in a disk brake.

The actuating unit 1 has a hydraulic pump 12, which can be driven at variable speeds by an electric motor 11. By means of a first line 14, the pressure side 13 of this pump 12 is connected in a pressure fluid-conducting manner to a cylinder chamber 15 of the cylinder-piston unit 3 remote from the brake lining. In the vicinity of the cylinder, a second line 17 branches from the first line 14 and leads to the suction side 16 of the pump 12. A pressure increase valve 18, which is embodied as a 2/2-port directional-control valve, is disposed in the first line 14 between the connection of the second line 17 and the pressure side 13 of the pump 12. The pressure increase valve 18 is spring-loaded into its open position; it can be switched into its closed position when actuated by an electromagnet. The pressure increase valve 18 is bypassed by a bypass line 19 in which a check valve 20 is provided, which closes in the direction from the pump 12 to the cylinder chamber 15. The second line 17 contains a pressure decrease valve 21 likewise embodied as a 2/2-port directional-control valve, which is spring-loaded into its closed position and assumes its open position when actuated by an electromagnet. A pressure fluid storage tank 22 is disposed between the pressure decrease valve 21 and the suction side 16 of the pump 12. In addition, the pressure side 13 and the suction side 16 of the pump 12 communicate by means of a return line 23, which is connected to the first line 14 and the second line 17. This return line 23 contains a 2/2-port directional-control valve 24, which is spring-loaded into its open position and can be switched into its closed position and arbitrary intermediary positions when actuated by an electromagnet. Finally, the actuating unit 1 contains a measuring transducer 25, which measures the pressure in the cylinder chamber 15 and will be referred to below as a pressure sensor.

The driver can actuate the actuating unit 1 and actuating units associated with the other vehicle wheels by means of a brake pedal 27, whose pedal path can be detected by a measuring transducer 28, which is referred to below as a path sensor. In addition, an electronic control unit 29 is provided, which can process the signal that represents an electrical brake request signal of the path sensor 28. The control unit 29 can control the electric motor 11 and the valves 18, 21, 24 of all of the actuating units 1 of the vehicle. In addition, the control unit 28 can process the signals measured by the pressure sensors 25 of the actuating units 1. Finally, the control unit 29 can process slip-dependent signals, which are detected with wheel rotation sensors, not shown, on the vehicle wheels, for purposes of a stability control of the vehicle. Finally, the control unit 28 can process slip-dependent signals, which are detected with wheel rotation sensors, not shown, on the vehicle wheels, for purposes of slip control, e.g. for an antilock brake control, traction control, or stability control of the vehicle.

The actuating unit 1 operates as follows:

When a brake request signal is generated, whether due to brake pedal actuation or the wheel slip control of the vehicle, which is not described in detail here, the control unit 29 switches the electric motor 11 of the pump 12 into operation and switches the directional-control valve 24 into its closed position while the pressure increase valve 18 and the pressure decrease valve 21 maintain their positions shown. The pump 12 aspirates pressure fluid from the storage tank 22 and feeds it through the first line 14 to the cylinder-piston unit 3 so that pressure is built up in the cylinder chamber 15 and the piston rod 6 presses the at least one brake lining 7 against the friction element 8 of the wheel brake 2. By means of the variable speed control of the electric motor 11, the pressure increase speed can be adjusted as a function of the course of the brake request signal. The pressure prevailing in the cylinder chamber 15 is detected by the pressure sensor 25, whose signal is processed in the control unit 29. When the pressure, which is a function of the brake request signal, is reached in the cylinder chamber 15, the directional-control valve 24 is switched into an intermediary position so that the pressure fluid supplied by the pump 12 is diverted to the suction side 16 of the pump through the return line 23 while the brake pressure is maintained. In order to reduce the pressure in the cylinder chamber 15 and possibly to reduce it completely, the intermediary position of the directional-control valve 24 is changed or it is switched into its open position. Due to the elasticity of the wheel brake 2, the piston 5 is restored and the pressure fluid displaced from the cylinder chamber 5 is diverted through the first line 14 and the return line 23 into the pressure fluid storage tank 22. The pressure decrease speed can be adjusted by means of the directional-control valve 24. When the breaking maneuver ends, the electric motor 11 is switched off.

For purposes of wheel slip control, the actuating unit 1 can be used to modulate the pressure in the cylinder chamber 15 of the cylinder-piston unit 3 by means of the control unit 29. Phases for pressure increase are produced by virtue of the fact that when the pump 12 is delivering pressure fluid, the pressure increase valve 18 assumes its open position and the pressure decrease valve 21 assumes its closed position. Pressure maintenance is produced by switching the pressure increase valve 18 into its closed position. Phases for pressure decrease are produced by virtue of the fact that the pressure increase valve 18 maintains its closed position and the pressure decrease valve 21 is switched into the open position. If the valves 18 and 21 fail and there is a very rapid pressure decrease, it is possible to relieve the cylinder chamber 15 by diverting pressure fluid to the storage tank 22 through the bypass line 19 and the directional-control valve 24, which is switched into its open position.

The actuating unit 1 is a self-sufficient system for each vehicle wheel. Preferably, each actuating unit of the vehicle is connected to a separate power supply or groups of actuating units are connected to separate power supplies. If one power supply fails, the other actuating units remain functional.

What is claimed is:

1. An actuating unit for a wheel brake of a motor vehicle, comprising a pressure fluid storage tank in an electric motor; a hydraulic pump as a sole component for pressure generation, said hydraulic pump being drivable at variable speeds by said electric motor and supplying pressure fluid from said storage tanks; an electrically controllable element provided for adjusting a return flow of pressure fluid and disposed between a pressure side and a suction side of said pump; a cylinder-piston unit connected to the pressure side of said pump and pressing at least one brake lining against and also lifting away the at least one brake lining from a friction element connected to a vehicle wheel; a control unit operative for processing electric brake request signals and slip signals and variably controlling said electric motor and said element; an electromagnetic pressure increase valve disposed in a first line connected to only said pump as a pressure source and extending between said pressure side of said pump and said cylinder-piston unit; and an electromagnetic pressure decrease valve disposed in a second line extending between said cylinder-piston unit and said suction side of said pump, said control unit, depending on slip, switching said valves into positions for pressure increase, pressure maintenance and pressure decrease, said pressure fluid storage tank being disposed between said pressure decrease valve and said suction side of said pump.

2. An actuating unit as defined in claim 1, wherein said pump is formed so that during a brake actuation said pump is continuously driven, said element which adjusts the return flow of pressure fluid to said pump being formed as a 2/2 port directional-control valve with an arbitrary number of intermediate positions.

3. An actuating unit as defined in claim 1; and further comprising a measuring transducer for pressure, whose signals are processed in said control unit, said cylinder-piston unit being connected to said measuring transducer.

* * * * *